US005774886A

United States Patent [19]

Kara

[11] Patent Number: 5,774,886
[45] Date of Patent: Jun. 30, 1998

[54] SYSTEM AND METHOD FOR AUTOMATICALLY PRINTING POSTAGE ON MAIL

[75] Inventor: Salim G. Kara, Houston, Tex.

[73] Assignee: E-Stamp Corporation, Houston, Tex.

[21] Appl. No.: 796,275

[22] Filed: Feb. 7, 1997

Related U.S. Application Data

[63] Continuation of Ser. No. 639,847, Apr. 19, 1996, Pat. No. 5,682,318, which is a continuation of Ser. No. 176,716, Jan. 3, 1994, Pat. No. 5,510,992.

[51] Int. Cl.$^6$ ................................................. G07B 17/02
[52] U.S. Cl. ............................................ 705/410; 235/375
[58] Field of Search .................................. 235/375, 381, 235/382; 364/400, 464.11, 464.13, 464.2; 705/401, 403, 410

[56] References Cited

U.S. PATENT DOCUMENTS

| | | | |
|---|---|---|---|
| 4,641,347 | 2/1987 | Clark et al. | 380/3 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,763,271 | 8/1988 | Field | 364/466 |
| 4,775,246 | 10/1988 | Edelmann et al. | 380/23 |
| 4,800,506 | 1/1989 | Axelrod et al. | 364/478 |
| 4,802,218 | 1/1989 | Wright et al. | 380/23 |
| 4,809,185 | 2/1989 | Talmadge | 364/464.13 |
| 4,812,994 | 3/1989 | Taylor et al. | 364/464.02 |
| 4,831,555 | 5/1989 | Sansone et al. | 364/519 |
| 4,864,618 | 9/1989 | Wright et al. | 380/51 |
| 4,868,757 | 9/1989 | Gil | 364/464.03 |
| 4,900,903 | 2/1990 | Wright et al. | 235/380 |
| 4,900,904 | 2/1990 | Wright et al. | 235/381 |
| 4,901,241 | 2/1990 | Schneck | 364/464.02 |
| 4,908,770 | 3/1990 | Breault et al. | 364/464.02 |
| 4,980,542 | 12/1990 | Jackson et al. | 235/375 |
| 5,065,000 | 11/1991 | Pusic | 235/381 |
| 5,111,030 | 5/1992 | Brasington et al. | 235/375 |
| 5,200,903 | 4/1993 | Gilham | 364/464.02 |
| 5,239,168 | 8/1993 | Durst, Jr. et al. | 235/432 |
| 5,510,992 | 4/1996 | Kara | 364/464.02 |

FOREIGN PATENT DOCUMENTS

| | | |
|---|---|---|
| 0137737 | 4/1985 | European Pat. Off. . |
| 2580844 | 10/1986 | France . |
| 2251210 | 7/1992 | United Kingdom . |
| 8801818 | 3/1988 | WIPO . |

*Primary Examiner*—Edward R. Cosimano
*Attorney, Agent, or Firm*—Fulbright & Jaworski L.L.P.

[57] ABSTRACT

A system and method for printing a postage meter stamp, including a desired postage amount, onto a piece of mail. A user obtains a touch memory utility ("TMU") button from the Post Office in order to obtain an amount of postage stored within the TMU button. A desired amount of postage is entered into the TMU button by a postal employee through a processor-based system. The user is then able to access this stored postage at the user's location through a complementary processor-based system. The processor-based system automatically calculates the required postage for a piece of mail based upon a set of parameters pertaining to the mail. Address information may also be printed onto an envelope along with the postage meter stamp through the use of a word processor program coupled to the present invention.

21 Claims, 6 Drawing Sheets

Level 1: Password.

BCLINTON

Level 2: Algorithm 1.

p1 = (d1 + d4 + d7 + d10 + d13 + d16) mod 256
p2 = (d2 + d5 + d8 + d11 + d14 + d17) mod 256
p3 = (d3 + d6 + d9 + d12 + d15 + d18) mod 256
p4 = (d19 + d22 + d25 + d28 + d31 + d34) mod 256
p5 = (d20 + d23 + d26 + d29 + d32 + d35) mod 256
p6 = (d21 + d24 + d27 + d30 + d33 + d36) mod 256
p7 = (d37 + d38 + d39 + d40 + d41 + d42) mod 256
p8 = (d43 + d44 + d45) mod 256

Level 3: Algorithm 2.

p1 = d1 mod 256
p2 = (d2 + d3) mod 256
p3 = (d4 + d5 + d6) mod 256
p4 = (d7 + d8 + d9 + d10) mod 256
p5 = (d11 + d12 + d13 + d14 + d15) mod 256
p6 = (d16 + d17 + d18 + d19 + d20 + d21) mod 256
p7 = (d22 + d23 + d24 + d25 + d26 + d27 + d28) mod 256
p8 = (d29 + d30 + d31 + d32 + d33 + d34 + d35 + d36 + d37
     + d38 + d39 + d40 + d41 + d42 + d43 + d44 + d45) mod 256

FIG. 2A

```
Quit  Options  Help
                         E-Stamp
TMU Serial # 2 128 176 32 0 0 0 175
ID              Password  202      Info  203        E-Stamp    Serial # / Zip 77014-9998
ID1   [BClinton]                                    208           209
                                                  [Initialize]  [Write]
                            10 45  12  15  93  77   0  14  99  98  44 110 151  65   2
                           244 45  75 194  86  97 218 211  46 250 237  69  28 167 196
                           100 11  53  72 141 182   5 167  64 106 190  63 119  13  63
              204
ID2   [193 240 33
       94 85 131 83         48 10  94 101  57  55  67 187 108  65 117 111 179 125
       195          ]      205 132 90  24 146 186 112 240 247   2 113 168 229  52
                            33 251 251   4 187  80 211  50  75 143 136   2  89  52 117
                   206     236 199
ID3   [48 104 213
       171 225 178 ]   205
        27 68                 [$500.00]
                    207
                                       TMU Verification
              201
                    Postage balance: $ 6.72    Time: 3:18  Date: 10-30-93  By: 77090-2765
```

FIG. 2B

```
Quit  Options  Help
                              E-Stamp
TMU Serial # 2 128 176 32 0 0 0 175

ID           Password  202      E-Stamp      Serial # / Zip 77014-9998
ID1  [        ]
         BClinton            208              209
                     Info  203   Initialize   Write
           204
ID2  [193 240 33  ]    10 45 12 15 93 77  0 14 99 98 44 110 151 65  2
     [94 85 131 83]   244 45 75 194 86 97 218 211 46 250 237 69 28 167 196
     [195         ]   100 11 53 72 141 182  5 167 64 106 190 63 119 13 63
           206         48 10 94 101 57 55 67 187 108 65 117 111 179 125
ID3  [48 104 213 ]    205 132 90 24 146 112 240 247 2 113 168 229 52
     [171 225 178]     33 251 251 4 187 80 211 50 75 143 136 2 89 52 117
     [27 68      ]    236 199
                  205
                                 $500.00
                  207
     201
              TMU Verification
Postage balance: $ 506.72   Time: 10:45 AM   Date: 12-15-93   By: 77014-9998
```

21

SYSTEM AND METHOD FOR AUTOMATICALLY PRINTING POSTAGE ON MAIL

REFERENCE TO RELATED APPLICATIONS

The present application is a continuation application of pending application Ser. No. 08/639,847, entitled "SYSTEM AND METHOD FOR STORING POSTAGE IN A COMPUTER SYSTEM," filed Apr. 19, 1996, now issued as U.S. Pat. No. 5,682,318, itself a continuation application of application Ser. No. 08/176,716, entitled "SYSTEM AND METHOD FOR AUTOMATICALLY PRINTING POSTAGE ON MAIL," filed Jan. 3, 1994, now issued as U.S. Pat. No. 5,510,992.

TECHNICAL FIELD OF THE INVENTION

This invention relates, in general, to the automatic provision of postage on envelopes and packages, and more specifically, to a system and method in which the postage is calculated automatically as part of the printing of an address on mail under control of a word processing program.

BACKGROUND OF THE INVENTION

Presently, it is common for individuals or businesses to have residing within their offices a postage meter rented from a commercial business such, for example, Pitney Bowes. This arrangement is very convenient, since letters may be addressed, postage applied, and mailed directly from the office without requiring an employee to physically visit the U.S. Post Office and wait in line in order to apply postage to what is often a quite significant volume of outgoing mail, or to manually apply stamps to each piece of mail in which case mail is slower because it has to go through a postage cancelling machine.

Quite naturally, postage meters were developed to relieve the manual application of stamps on mail and to automate the above process. Nevertheless, a postage meter residing within an office is not all that convenient and efficient as it may first seem to be. First, a postage meter may not be purchased, but must be rented. The rental fees alone are typically over twenty dollars per month. For a small business, this can be quite an expense to incur year after year. Second, a postage meter must be adjusted, serviced and replenished manually; i.e., each day the date must be adjusted manually, periodically, ink on the stamp pad within the postage meter must be refilled; and when the amount of postage programmed within the postage meter has expired, the meter must be manually unplugged, placed into a special case (the meter is of a significant weight), and an employee must visit a U.S. Post Office to have the postage available within it replenished. Moreover, the teller at the U.S. Post Office must cut the seal, replenish the meter with a desired amount of postage, and reseal the meter before returning it to the employee. The meter must then be returned to the office and powered up. A slightly more expensive meter (rental of approximately $30.00 more) works in the following manner: 1) set up an account with Pitney Bowes, 2) 7 to 10 days before a user requires any postage, the user deposits with the meter owner the amount of postage required, 3) the user then calls the owner (7 to 10 days later) and they issue instructions as to the manual pushing of a variety of buttons on the meter (programming) which will replenish the postage amount on the meter. Nonetheless, the meter must be taken to the Post Office every 6 months.

Thus, in addition to the monthly rent, the servicing and replenishing of the meter requires the time and expense of at least one employee to take it to the U.S. Post Office to have it replenished. Of course, this procedure results in downtime wherein the postage meter is not available to the business for the application of postage to outgoing mail. In addition, because of the monthly rent and the size of these devices, it is generally not practical for businesses to have more than one postage meter to alleviate this down-time.

As previously mentioned, the alternative to a business, especially a small business, is to forego the advantages of a postage meter and to buy sheets, or books, of stamps. Without a doubt, this is not a sufficient solution. Since a variety of denominations of stamps are generally required, applying two 29¢ stamps to a letter requiring only 40¢, will begin to add up over time. Additionally, it is difficult for a business to keep track of the stamps physically and logistically and are subject to pilferage and degeneration from faulty handling. Moreover, increases in the postal rate (which seem to occur every three years) and the requirements for various postages for international mail, makes the purchase of stamps even more inefficient and uneconomical.

Because of different postage zones, different classes of mail, different postage required by international mail and the inefficiency of maintaining stamps within an office, it is important to have an automatic postage system, such as the aforementioned inefficient and relatively expensive postage meter. Accordingly, there is a need in the art for a system and method that provides the automatic placement of postage on mail at locations other than a U.S. Post Office, while not requiring the use of a traditional postage meter.

SUMMARY OF THE INVENTION

Thus, it is a primary object of the present invention to provide a system and method for automatically providing for the placement of postage on mail outside of the environment of the U.S. Post Office, without requiring the use of a conventional postage meter.

In the attainment of the primary object, the present invention is embodied within a processor-based system located at a business' offices. A means is provided for purchasing a desired amount of postage at a U.S. Post Office and for storing this purchased amount within a storage means. Thereafter, a user may invoke the processor-based system to access the storage means and retrieve a portion of this stored amount of postage for subsequent printing on an envelope, or a label, via a printing means coupled to the processor-based system, a desired amount of postage in a form similar to that employed by a conventional postage meter.

In a preferred embodiment of the present invention, the processor-based system is a personal computer ("PC") located within the business office. The PC will store a program, hereinafter referred to as the "E-STAMP Program," which requests input from the user on the amount of desired postage and subsequently prints on an envelope through a printer attached to the PC, or on a label through a printer or a special purpose label-maker coupled to the PC the desired amount of postage in the form of a typical meter stamp. The E-STAMP Program interfaces with the user through the display screen and the keyboard, or mouse, of the PC.

In another preferred embodiment of the present invention, a touch memory utility ("TMU") button, manufactured by, for example, Dallas Semiconductor, Dallas, Tex., is utilized for transferring the obtained amount of postage from the U.S. Post Office to the processor based system. Typically, a user will physically take the TMU button to (or purchase from) a U.S. Post Office location, which will have installed at its location a system complementary to the one installed on the customer's PC. A postal worker will interface the TMU button with the system residing at the Post Office in order to replenish the amount of postage programmed within the button in an amount requested and purchased by the customer. The user may call a number (Post Office) and have the Post Office transfer the required amount by MODEM. The Post Office may also elect to sell disposable TMU buttons pre-loaded in various denominations.

The customer will then physically carry the button back to the processor-based system, couple the button to a corresponding receiving apparatus coupled to the processor-based system so that portions of the obtained postage may be downloaded to the E-STAMP Program upon a request by the customer. Upon invocation of the E-STAMP Program by the customer, the program will inform the customer of the newly obtained amount of postage via the display screen.

In another preferred embodiment of the present invention, the display screen coupled to the processor-based system employs a "windows" type display for interfacing with the user. Through the display screen, the E-STAMP Program will request a password from the user and the amount of postage the user wishes to apply to a piece of outgoing mail or corresponding label for subsequent application to a package or envelope. The user will enter the desired amount of postage, the program will retrieve this postage stored within the TMU button, and the E-STAMP Program will print a meter stamp through a coupled printing device onto the envelope or label.

In a preferred embodiment of the present invention, the E-STAMP Program may be coupled to a word processing program residing within the processor-based system. As a result, the application of the meter stamp may be made in conjunction with the word processing program, which has the capability to print envelopes, separately or in conjunction with the printing of a corresponding letter produced by the word processing program.

In another preferred embodiment of the present invention, the aforementioned TMU buttons are specially manufactured by Dallas Semiconductor for use in conjunction with E-STAMP Programs, i.e., unique serial numbers specific to the E-STAMP Program are embedded within each TMU button. These serial numbers are then provided to the U.S. Post Office for programming into their corresponding E-STAMP Program and system. Thus, a form of security is provided since only the TMU buttons specially manufactured for use with the E-STAMP Program are able to receive or retrieve data pertaining to postage amounts when taken to a Post Office for replenishing, and to transfer this data to a customer system, as previously described.

Additionally, a special password could be dedicated for use with the E-STAMP Program so that access is only provided to users entering the correct password. As a result of the aforementioned, the U.S. Post Office can be assured that only authorized users are able to obtain postage replenishment, and that users are unable to replenish their postage within the E-STAMP Program or the TMU button without cooperation from the U.S. Post Office. The aforementioned serial numbers and passwords may also allow a user and the U.S. Post Office to track postage used by every company, department, employee, etc. Furthermore, other software programs may also be configured to access the E-STAMP Program so that spread sheets and/or graphs may be produced providing statistics on postage use within a business.

In an alternative embodiment of the present invention, the E-STAMP Program is able to automatically calculate the correct postage to place on a letter, parcel or label as a function of the class, zone and weight of the particular item to be mailed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A–2B illustrates a display screen utilized by the present invention to interface with a U.S. Post Office employee when replenishing postage within the present invention;

DETAILED DESCRIPTION OF THE INVENTION

Figures 1, 4:
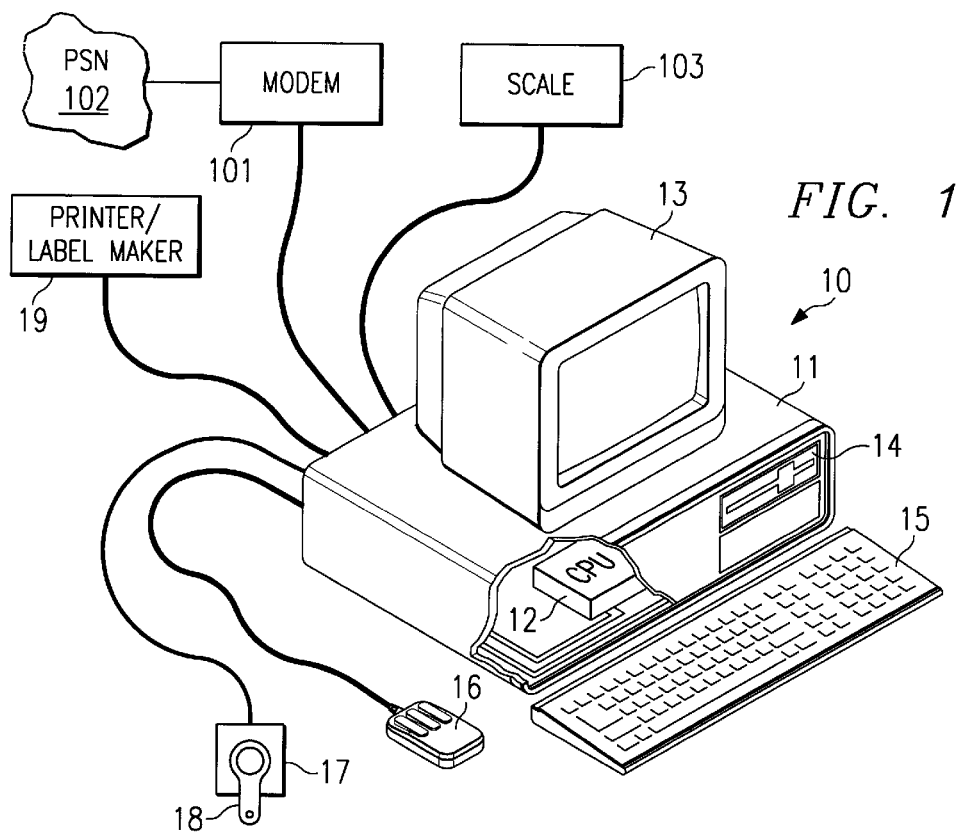
FIG. 1 illustrates a processor-based system for implementation of the present invention.
FIG. 4 illustrates a preferred embodiment of the security techniques utilized within the present invention.

Referring to FIG. 1, there is illustrated processor-based system 10 utilized for implementing the present invention, specifically the aforementioned E-STAMP Program at both the customer's site and the U.S. Post Office site.

Throughout the remainder of this description, reference is made to the U.S. Post Office. Note, however, that the present invention may be implemented within any country and with respect to any postal system.

System 10 includes chassis 11 enclosing processor ("CPU") 12 and storage device 14. Coupled to CPU 12 is display 13, keyboard 15 and mouse 16. Furthermore, system 10 is adapted for coupling with conventional Touch Memory Utility ("TMU") button 18, shown engaged with button holder 17. In a preferred embodiment, system 10 is a PC. In an alternative embodiment, the system 10 could be part of a main-frame computer or system 10 could be part of a networked system.

TMU button 18 is available from Dallas Semiconductor, Dallas, Tex. In a preferred embodiment of the present invention a batch of TMU buttons will be manufactured with specifically designated serial numbers for use solely with the present invention.

System 10 may be utilized at a customer's site for permitting a user to retrieve postage storage within button 18 for subsequent printing in conjunction with a conventional postage meter stamp onto a piece of mail through printer 19, which is coupled to system 10.

Additionally, system 10 may be employed at a U.S. Post Office for permitting a postal worker to replenish the amount of postage stored within button 18 at the request of a customer in a manner to be discussed below.

Alternatively, a pair of systems 10 may be linked together through Public Switched Network ("PSN") 102 via modem 101 or directly through digital telecommunications trunks (not shown).

Referring to FIG. 2A, there is illustrated a preferred embodiment of a display screen shown on display 13 to a U.S. Post Office employee when accessing the present invention on system 10. Processor-based system 10 located within the U.S. Post Office location may be linked via PSN 102 in a conventional well known manner (such as through modem 101) so that information may be shared between the various Post Offices. Generally, a copy of the E-STAMP Program will be stored within at least one processor-based system at selected U.S. Post Office locations.

As noted, the program, in a preferred embodiment, will display screen 20 to the postal worker. Of course, the particular display aspects illustrated in FIG. 2A may be modified in any one of numerous ways. Also, in a preferred embodiment of the present invention, processor-based system 10 will provide for input from a user via keyboard 15 and mouse 16. However, other various forms of input available to processor-based systems may be utilized, such as a light pen or a touch-sensitive screen (both not shown).

At the upper right-hand corner of display screen 20, there is indicated a Postmaster serial number, in this example "77014-9998." These five bytes stored within system 10 may be specifically designated for the particular Post Office wherein system 10 and the E-STAMP Program reside. This serial number represents the zip code of the Post Office location, or could be selected at random.

In the upper left-hand corner of display screen 20 is illustrated a TMU serial number, in this example "2 128 176 32 0 0 0 175." These eight bytes stored within TMU button 18, which may represent numbers from 0 to 255, are specifically assigned to and identify TMU button 18. Thus, display screen 20 indicates that the postal employee has coupled TMU button 18 to processor-based system 10, which incorporates the E-STAMP Program.

Typically, the first two numerals (bytes) within the TMU serial number could be assigned by the button (or memory) manufacturer. The third byte is selected by the U.S. Postal System and identifies TMU buttons specifically designed for the E-STAMP Program, therefore excluding other TMU buttons not designed for the E-STAMP Program, and also assisting in excluding any other means for accessing the E-STAMP Program. As a result, the present invention may be designed so that only authorized TMU buttons may access the E-STAMP Program for replenishment of postage as will be discussed below.

The remainder of the TMU serial number is basically the sequential serial number of TMU button 18 in particular.

As the E-STAMP Program reads the information stored within TMU button 18, the TMU serial number is displayed on screen 10. Additionally, information is displayed within block 201 specifically pertaining to the information stored within button 18. This "TMU Verification" information shows the postage balance currently residing within button 18, the time and date when the aforementioned funds were electronically stored within button 18, and the post office location where this postage was input. As shown within box 201, TMU button 18 currently contains a postage balance of $6.72, which is most likely a portion of the postage that was input into button 18 at 3:18 a.m. on Oct. 30, 1993, at the Post Office location represented by zip code "77090-2765." It may be observed that this serial number is different from the E-STAMP serial number shown at the upper right-hand corner of display screen 20, indicating that these numbers represent two different Post Office locations, and that button 18 was formerly coupled to system 10 at Post Office 77090-2765 but is currently coupled to system 10 residing at Post Office 77014-9998.

In a manner to be discussed in detail below with respect to FIG. 3, the first password (i.e., BCLINTON) as illustrated within block 202 is entered by Post Office (Postage Maker) software and will match that of E-STAMP software. If the Post Office requests it, we could include an extra password, but only to access and start the program. As a result of the entering of the correct password by Postage Maker, a string of numerals are displayed within block 203. In a preferred embodiment of the present invention, the first several numerals within block 203 represent the current time and date. A second string of numerals represent the E-STAMP serial/zip code number of this particular system 10. The remainder of the numbers are generated randomly by the E-STAMP Program. This generation of random numbers is detailed below.

Thereafter, within block 204, a second password, which is generated through an algorithm from the numbers generated within block 203, is shown. These numbers are used as a password to assist in the random generation of the numerals within block 205. Thereafter, another algorithm utilizes the randomly generated numerals within block 205 to derive the third password displayed within block 206. If all is correct, the cursor will then stop within block 207 so that the postal employee may enter a desired amount of postage in U.S. dollars as requested by the user owning TMU button 18 currently coupled to the E-STAMP Program. All of the above numbers are not displayed on the screen and all passwords are hidden.

As shown in block 207, the user has desired to add $500.00 postage to TMU button 18. This amount has been entered by the employee. Subsequent to entering the $500.00 amount, the postal employee will press button 208, and then press button 209 to "write" the $500.00 amount into TMU button 18 coupled to system 10.

Immediately thereafter, display screen 21, illustrated in FIG. 2B, is shown to the postal employee. Display screen 21 is similar to display screen 20 except for the new information within block 201 which now shows that TMU button 18 contains $506.72 of postage, which was updated at 10:45 a.m. on Dec. 15, 1993 by the E-STAMP Program located at Post Office location "77014-9998."

Figure 3:
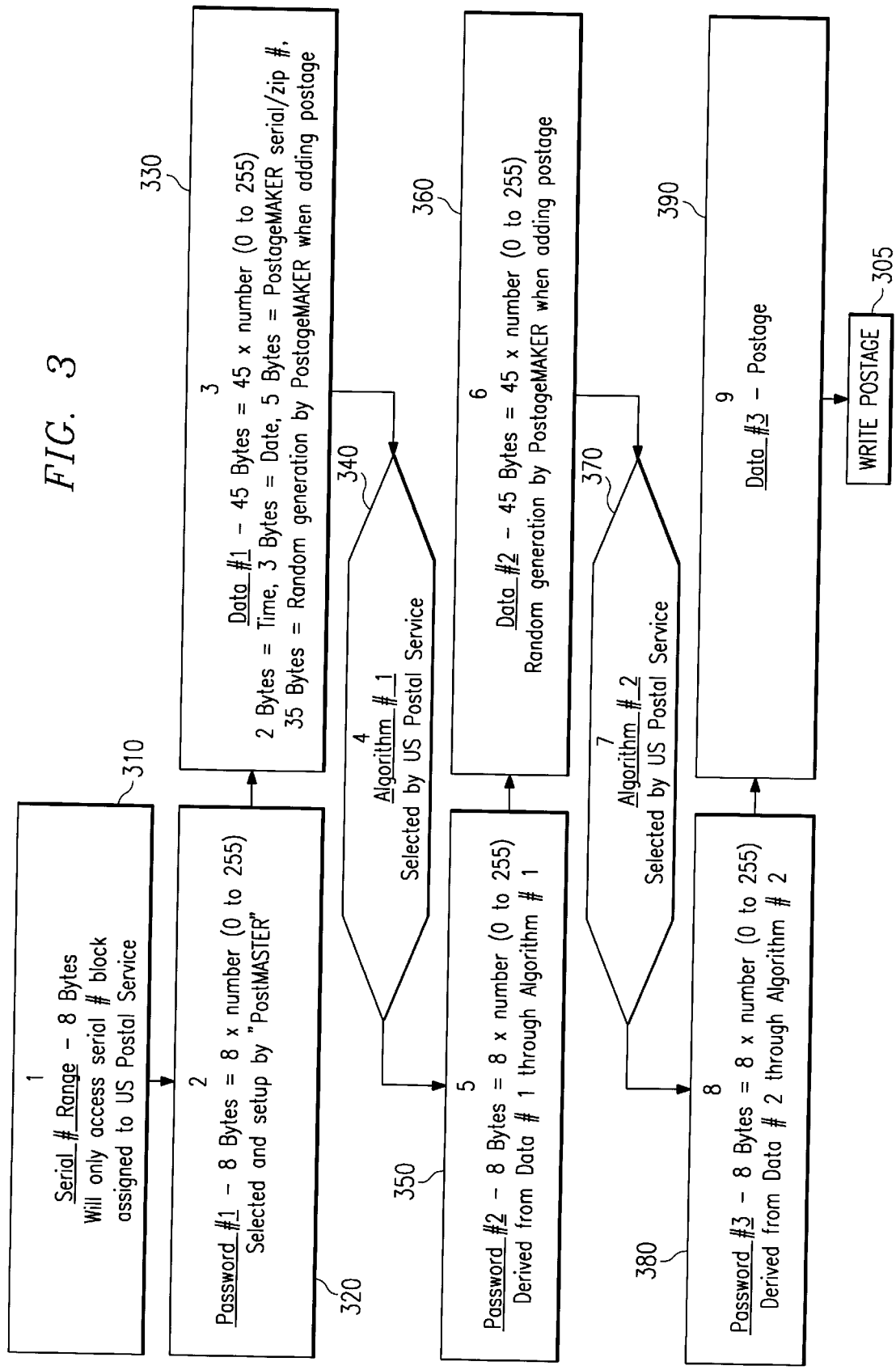
FIG. 3 illustrates a flow diagram of the replenishing process.

Referring next to FIG. 3, there is illustrated a flow diagram of the aforementioned method of providing security within the present invention. First, in block 310, the TMU serial number is accessed by the security program within the present invention. If the TMU serial number is not one specifically assigned to the U.S. Postal Service, the process will not proceed to step 320. In step 320, the program will write a password provided by the creator of the program. Thereafter, at step 330, the aforementioned data is produced and displayed within block 203. The random numerals will be produced as a function of the entered password.

Thereafter, in step 340, a first algorithm selected by the U.S. Postal Service will operate on the data within block 203 to produce a second password (step 350). This second password, displayed within block 204, is used within step 360 to generate a second set of data (the numerals displayed within block 205). A second algorithm within step 370, utilizes the second set of data to produce a third password (step 380). Once the above is written on the TMU, the Post Office employee will be able to enter the desired postage within block 207 (step 390). Thereafter at step 305, write button 209 is "depressed" to thereby store the additional postage within TMU button 18.

Referring next to FIG. 4, there is illustrated the algorithm used within the present invention, and described with respect to FIG. 3. Note that the TMU serial number may be incorporated into the algorithm(s) to make each TMU button unique. For a given 8-byte password, "p1" represented the first byte of that password. For a given 45-byte data area, "d1" represents the first byte of that data. The "mod operator" stands for the modulus, or remainder, of a division.

Figure 5:
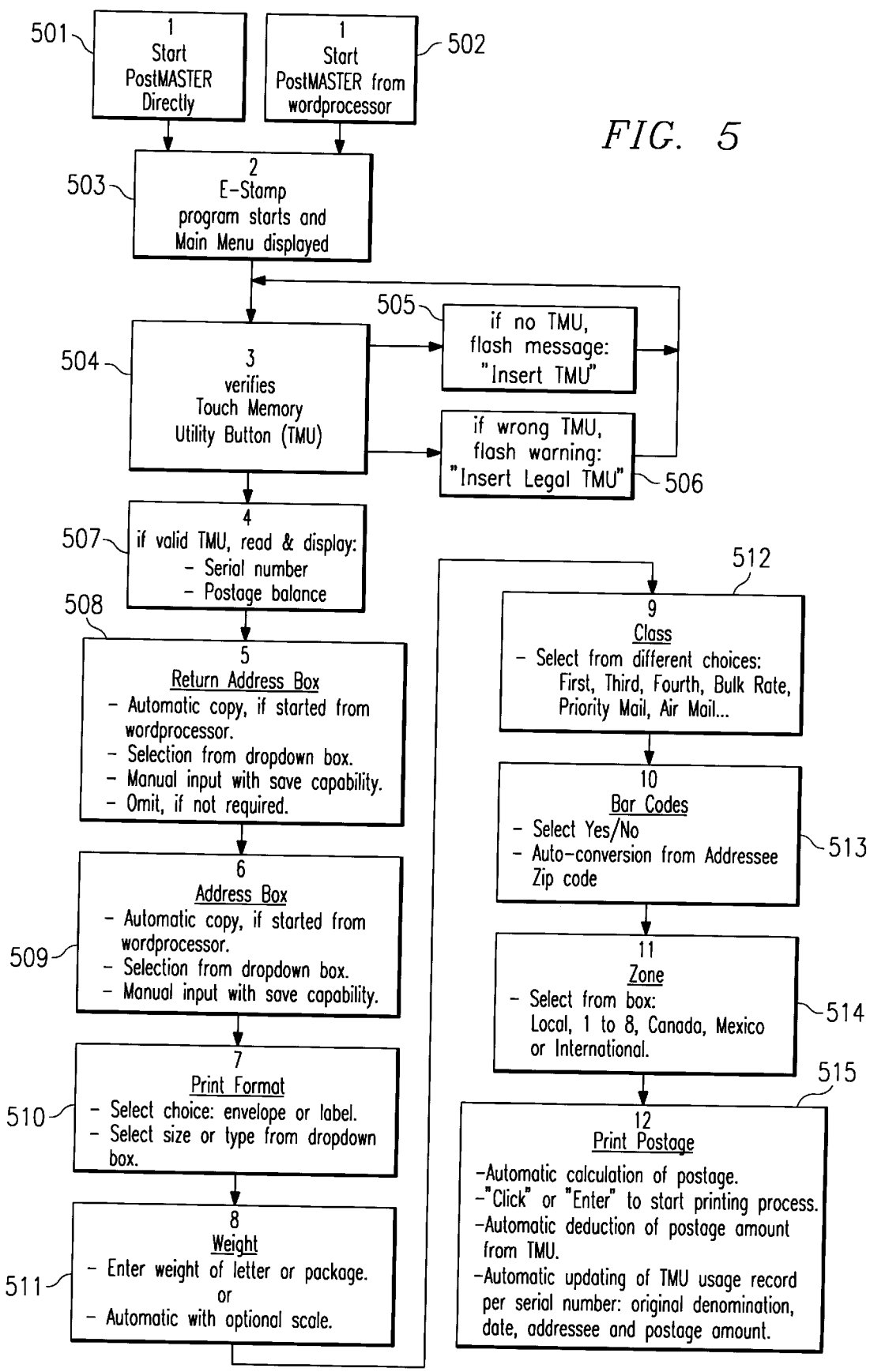
FIG. 5 illustrates a flow diagram on an operation of the present invention within a processor-based system.

Referring next to FIG. 5, there is illustrated a flow diagram of the process employed within processor-based system 10 configured for allowing a user to print a postage meter stamp.

Figure 6:
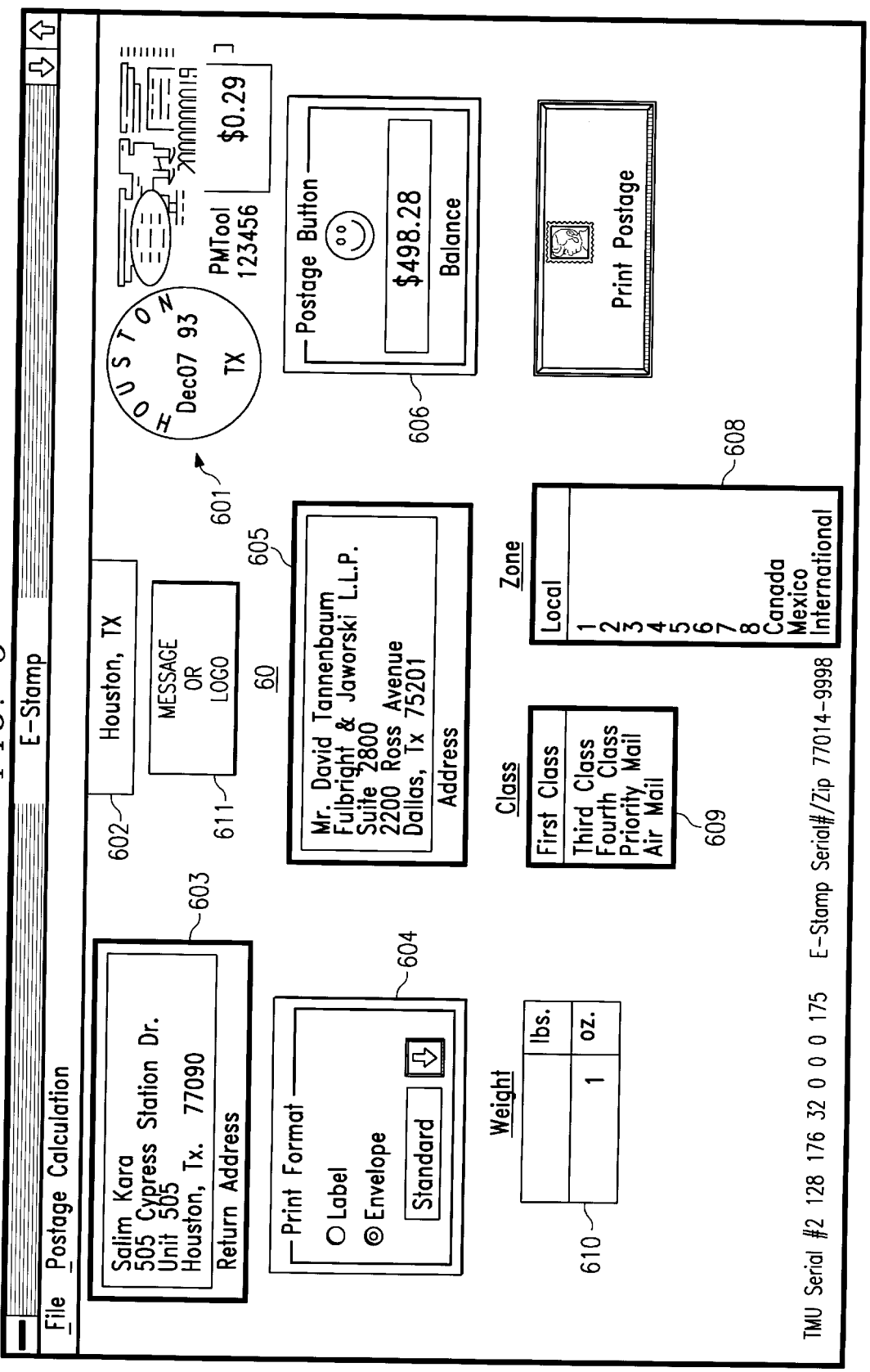
FIG. 6 illustrates a display interface provided to a user when accessing the present invention on a processor-based system.

As previously discussed, the E-STAMP Program may be a stand alone program, or it may be associated and coupled with a word processor program. Therefore, the E-STAMP Program may be started directly (step 501) or through a word processor program also residing on the processor-based system 10 (step 502). Thereafter, at step 503, the E-STAMP Program shows display 60, illustrated and described with respect to FIG. 6, to the user.

Next, in step 504, as shown in FIG. 5, the E-STAMP Program verifies the TMU serial number associated with TMU button 18 coupled to processor-based system 10. If TMU button 18 has not been inserted within its receiver, at step 505, a message is flashed to the user to insert TMU button 18. If the wrong TMU button has been inserted and coupled to system 10, at step 506, a warning is flashed to the user to insert an authorized, or valid, TMU button within box 504 there are several steps as follows:

Step 1—Serial number is verified.
Step 2—"E-STAMP" will match its Password 1 (BCLINTON) with the TMU's Password 1. If ok,
Step 3—Will read information in Data 1 and process it through algorithm 1.
Step 4—If the results of step 3 matches Password 2, it will proceed to Data 2.
Step 5—Will read information in Data 2 and process it through algorithm 2.
Step 6—If the results of step 5 matches Password 3, it will then be able to access Data 3 which contains postage amount and proceed to step 507.

Furthermore, a TMU button not specifically programmed for use with the E-STAMP Program will also produce a warning such as is shown in step 506.

If a valid TMU button is coupled to system 10, at step 507, the information within TMU button 18 is read and displayed on display screen 60. TMU button 18's serial number is displayed in conjunction with E-STAMP serial number 607. The remaining postage balance residing within TMU button 18, is displayed within block 606.

Next, at step 508, return address box 603 is completed automatically or manually. The address within 603 may be automatically entered from the adjoining word processor program, the address may be selected from a drop-down box (not shown), or the address may be manually inputted. Any entered address may be saved within the E-STAMP Program. Additionally, if a return address is not desired, it may be omitted.

Thereafter, in step 509, the contents of address box 605 are entered in a manner similar to the contents of return address 603.

Next, at step 510, the user may select the print format by the use of box 604. As illustrated, the meter label may be printed on a label through printer/label maker 19, or a choice may be made to print the postage meter stamp on an envelope inserted within printer 19, which may be chosen to be a standard size or a nonstandard size as selected by the user. Note that if the postage meter stamp is to be printed on a label, it may be desired that the return address within 603 and the address within box 605 not be printed.

Thereafter, in step 511, the user enters the weight of the package or letter associated with the postage meter stamp, as illustrated in box 610. This weight may be entered manually, or automatically through the use of scale 103 coupled to processor-based system 10 in a manner well known in the art.

Thereafter, in step 512, the user selects the class of mail from the choices shown in box 609. At step 513, the user may select whether or not a bar code is to be printed along with the meter stamp which are standard POSTNET ZIP+4 Coding as provided in Postal Service Publication 67.

Next, at step 514, the user may select a postal zone or alternatively select that the particular piece of mail is to be sent to Canada, Mexico or some other international designation.

The E-STAMP Program will automatically incorporate the aforementioned entered parameters—weight, class, zone—in order to correctly calculate the correct postage to print in conjunction with the mete stamp and to deduct from the postage amount stored within TMU button 18.

Lastly, in step 515 as are illustrated in box 608, the E-STAMP Program utilizes the input/output ports of processor-based system 10 to send to printer/label maker 19, the correct data pertaining to the meter stamp to be printed on an envelope or label. Concurrently, the amount of postage printed is automatically deducted from the amount stored within TMU button 18. Other information is also automatically updated including the usage record for this particular serial number of TMU button 18 and any other information, such as the addressee, the postage amount, the date, and the original denomination.

Note that during the selection of the various parameters within display 60, the E-STAMP Program may be implemented to update the postage amount displayed within meter display 601 as each parameter is chosen on essentially a real-time basis.

The aforementioned steps may be repeated for a subsequent piece of mail, or the user may decouple TMU button 18 from system 10.

Box 602 is provided for the user to insert the location from which the mail is to be sent. This location is added within display 601 as is printed on the stamp. This location also may be utilized by the Program to calculate the correct postage.

Message box 611 is provided to allow the user to add a message or greeting (e.g., "Happy Holidays") to be printed next to the meter stamp. This message may be changed at any time by the user, directly or by a "merge" command in conjunction with a word processing or graphics program coupled to the E-STAMP Program. Using the E-STAMP system and method users like lawyers, accountants, advertising agencies, etc., who bill their clients for postage will be able to keep track of postage expenses on a per client basis. Also, Post Offices may elect to a) sell disposable TMUs, or b) pre-load TMUs at only some selected centers and only sell or exchange TMUs at Post Offices. Also note that while the portable memory has been shown to be a "button" memory, any memory device having some residual data capability will work, providing the security problems are overcome. Since algorithms can be used to control security a standard "diskette" can be used if desired.

The aforementioned E-STAMP Program has been shown and described with respect to a "windows"operating environment on a PC. Of course, other means could be employed for implementing the present invention within a processor-based system.

Although the present invention and its advantages have been described in detail, it should be understood that various changes, substitutions and alterations can be made herein without departing from the spirit and scope of the invention as defined by the appended claims.

What is claimed is:

1. A system utilizing a first personal computer of a plurality of personal computers for generating a meter stamp having a predetermined value from electronic postage credit stored within a fungible postage storage device, said system comprising:

a portable processor device having information storage capacity associated therewith, said portable processor device being permanently configured for use as a postage storage device, said permanent configuration including storing identification information identifying said portable processor device to said system in said portable processor device upon manufacture, said portable processor device having electronic postage credit information stored in said information storage capacity, said portable processor device also having information with respect to a system wide password identified with said system stored in said information storage capacity; and means for generating said meter stamp through information communication between said first personal computer and said portable processor device, said generating means depleting a portion of said postage credit stored in said information storage capacity only upon a determination said stored identification information identifies said portable processor as being associated with said system and information stored in said first personal computer matches said password information stored in said portable processor device, wherein each of said plurality of personal computers are suitable for use with the same said portable processor device and wherein said portable processor device is to be discarded once substantially all of said postage credit is depleted.

2. The system of claim 1, wherein said identification information comprises a unique serial number specific to a postage program operable on said plurality of systems.

3. The system of claim 2, wherein said serial number includes at least a character selected by an issuing authority to identify said postage storage device as authorized for use in said system.

4. The system of claim 1, further comprising:

means for initializing said portable processor device for use in said system, said initializing means being operable at least in part on an administrative processor based system not of said plurality of processor based systems.

5. The system of claim 4, wherein said initializing means comprises said postage credit inputting means and said identification information providing means.

6. The system of claim 1, wherein said portable processor device also includes a hierarchy of password algorithms, and wherein said password algorithms are utilized in addition to said determination said stored identification information identifies said portable processor.

7. The system of claim 6, wherein said hierarchy of password algorithms operates to verify said system wide password information.

8. The system of claim 6, wherein said hierarchy of password algorithms operates to process first data, including at least a portion of said identification information, associated with said portable processor device to verify a first password, and wherein said hierarchy of password algorithms operates to process second data, including at least a portion of said processed first data, associated with said portable processor device to verify a second password.

9. A method for generating a meter stamp having a predetermined value from electronic postage credit stored within a fungible postage storage device, said method comprising the steps of:

obtaining a portable device having electronic postage credit information stored therein, said portable device also having postage system association information and information with respect to a system wide password stored therein, wherein said portable device is operable with any number of processor based systems of a plurality of processor based systems through reference to said system association information and said system wide password information; and generating said meter stamp through information communication between a select host processor based system of said plurality of processor based systems and said portable device, wherein said electronic postage credit is decremented in an amount of postage generated by said generating step, and wherein said portable device is disposed of upon depletion of said electronic postage credit.

10. The method of claim 9, further comprising the step of:

providing said portable device with said postage system association information substantially at the time of manufacture.

11. The method of claim 9, wherein said postage system association information comprises a unique serial number.

12. The method of claim 11, wherein said serial number includes at least a bit selected by an issuing authority to identify said portable device as authorized for use in said postage system.

13. The method of claim 9, further comprising the step of:

initializing said portable device for use in said system, said initializing step operable at least in part on an administrative processor based system not of said plurality of processor based systems.

14. The method of claim 13, further comprising the step of:

inputting said postage system association information into said portable device.

15. The method of claim 13, further comprising the step of:

inputting said postage credit into said portable device.

16. A disposable apparatus for electronically storing postage credit to be utilized to generate a postage indicia by ones of a plurality of host general purpose processor based systems, said apparatus comprising:

means for removably coupling said apparatus to a host system of said plurality of host systems to provide information communication therebetween;

means, including at least a multiple level password hierarchy, for controlling said information communication;

means for electronically storing information to be utilized by said host system when coupled to said apparatus via said coupling means, said stored information including at least a postage credit;

means for fungibly identifying said apparatus as authorized for utilization in generating said postage indicia, said identifying means including storage of information unique to a postage indicia generation system to which said plurality of host systems are associated, wherein at least a portion of said identifying means is adapted for use with said multiple level password hierarchy; and means for communicating at least a portion of said postage credit from said apparatus to said host system under control of said controlling means, wherein said at least a portion of said identifying means is utilized in generation of a password of said multiple level password hierarchy, and wherein said apparatus is disposable upon depletion of said postage credit.

17. The apparatus of claim 16, further comprising:

means for receiving administrator input pertaining to a desired amount of postage to be initially stored within said apparatus.

18. The apparatus of claim 16, wherein said portable processor device is a TMU button.

19. The apparatus of claim 16, wherein said fungible identification means comprises a unique serial number specific to a postage indicia generation program operable on ones of said plurality of host systems.

20. The apparatus of claim 19, wherein said serial number includes at least a character selected by an issuing authority to identify said apparatus as authorized for use in generating said postage indicia.

21. The apparatus of claim 19, wherein said unique serial number is stored by said electronic storage means.

* * * * *